United States Patent
Sander

(10) Patent No.: US 6,973,563 B1
(45) Date of Patent: Dec. 6, 2005

(54) MICROPROCESSOR INCLUDING RETURN PREDICTION UNIT CONFIGURED TO DETERMINE WHETHER A STORED RETURN ADDRESS CORRESPONDS TO MORE THAN ONE CALL INSTRUCTION

(75) Inventor: Benjamin T. Sander, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 618 days.

(21) Appl. No.: 10/037,403

(22) Filed: Jan. 4, 2002

(51) Int. Cl.$^7$ .............................................. G06F 9/42
(52) U.S. Cl. ..................................... 712/242; 712/239
(58) Field of Search .............................. 712/233, 234, 712/239, 241, 242

(56) References Cited

U.S. PATENT DOCUMENTS

| | | | | |
|---|---|---|---|---|
| 5,732,272 A | * | 3/1998 | Gochee ...................... | 717/128 |
| 5,768,576 A | * | 6/1998 | Hoyt et al. ................. | 712/238 |
| 5,822,575 A | * | 10/1998 | Tran ........................... | 712/239 |
| 6,170,054 B1 | * | 1/2001 | Poplingher ................. | 712/242 |
| 6,269,436 B1 | | 7/2001 | Tran et al. | |

OTHER PUBLICATIONS

"Stacks," www.funducode.com/freec/datastructure/datastruct1.htm, Apr. 22, 2001, pp. 1-4.*

* cited by examiner

*Primary Examiner*—Eddie Chan
*Assistant Examiner*—David J. Huisman
(74) *Attorney, Agent, or Firm*—Meyertons Hood Kivlin Kowert & Goetzel, P.C.; B. Noël Kivlin

(57) ABSTRACT

Various embodiments of methods and systems for implementing a return address prediction mechanism in a microprocessor are disclosed. In one embodiment, a return address prediction mechanism includes a return storage and a controller. The return storage includes one or more entries. One of the entries includes a count and a first return address that corresponds to a recently detected call operation. The controller is configured to receive a new return address that corresponds to a call instruction and to compare the new return address to the return address stored in the entry. If the new return address equals the return address in the entry, the controller may be configured to increase the value of the count in the entry. By increasing the count instead of allocating a new entry in the return storage to the new return address, the effective size of the return storage may be increased.

35 Claims, 7 Drawing Sheets

MICROPROCESSOR INCLUDING RETURN PREDICTION UNIT CONFIGURED TO DETERMINE WHETHER A STORED RETURN ADDRESS CORRESPONDS TO MORE THAN ONE CALL INSTRUCTION

BACKGROUND OF THE INVENTION

1. Field of the Invention

This invention is related to the field of microprocessors and, more particularly, to return address prediction mechanisms.

2. Description of the Related Art

Superscalar microprocessors are capable of executing multiple instructions per clock cycle. However, in order to take advantage of this ability, a superscalar microprocessor needs to be provided with a steady stream of instructions. If a microprocessor's instruction stream stalls, its pipeline may contain "bubbles" or gaps and, as a result, fewer instructions may be executed each cycle. Consequentially, if the rate at which instructions are being fetched declines below a certain threshold, a processor's performance may be reduced.

When a processor executes a typical set of instructions, control flows sequentially from one instruction to the next. In this situation, supplying the processor with instructions may simply involve fetching the next sequential instruction in the set. However, if certain instructions alter the control flow, determining which instruction to fetch next becomes more difficult. For example, a branch instruction is an instruction that causes the next instruction to be fetched from one of at least two possible addresses. One address is the address immediately following the branch instruction. This address is referred to as the "next sequential address." The second address is specified by the branch instruction, and is referred to as the "branch target address" or simply the "target address." Branch instructions typically select between the target address and the next sequential address based on a particular condition flag that is set by a previously executed instruction.

Since branches potentially alter the control flow in an instruction sequence, they create difficulty in superscalar microprocessors because the actual outcome of the branch may not be determined until the branch exits the pipeline. As a result, the location of the instruction following the branch instruction (at either the next sequential address or the branch target address) may not be known until the branch has executed. To avoid bubbles in the pipeline, however, the next instruction needs to be fetched as soon as possible after the branch instruction is fetched. In order to handle this situation, most pipelined processors employ some sort of branch prediction so that they can speculatively begin fetching instructions based on a predicted outcome of the branch without having to wait for the branch to actually resolve. Branch instructions are typically predicted when the branch instruction is decoded or when the branch instruction is fetched, depending on the branch prediction scheme and the configuration of the microprocessor.

One consequence of using branch prediction is that some predictions may be incorrect. If a branch prediction is incorrect, or "mispredicted" (as determined when the branch instruction executes), then the instructions that were speculatively fetched after the branch instruction was fetched are discarded from the instruction processing pipeline and the correct instructions are fetched.

A particularly difficult type of branch instruction to predict is a subroutine return instruction (e.g., RET, the return instruction defined for the x86 microprocessor architecture). For example, some superscalar microprocessor architectures include a "stack" area in memory. One of the uses of a stack is for passing information between a program and a subroutine called by that program. One such item of information that may be passed between a program and a subroutine may be the address of the program instruction that should be executed when the subroutine finishes execution (i.e., the return address). Typically, the return address identifies the instruction following the call to the subroutine in the calling program. A return from a subroutine may be initiated by a subroutine return instruction (or, in some architectures, an indirect jump instruction) that pops the return address off the stack. However, since instructions may be executed in parallel, the value that is at the top of the stack when a return instruction is fetched or decoded is not necessarily the address that will be at the top of the stack when the return instruction is executed. As a result, unlike some other types of branches, the target address of a return instruction cannot be determined until the return instruction is actually executed, frustrating branch prediction.

In order to be able to avoid stalls when return instructions are encountered, many microprocessors use return stacks or return address buffers to predict return addresses. These mechanisms store return addresses whenever a call instruction is detected. When a return instruction is detected, the top value of the return stack is typically removed from the return address storage and provided as the predicted return address for the detected return instruction.

Return address prediction mechanisms typically include several entries in order to be able to handle nested subroutine calls in which one subroutine calls another. One potential problem that may be encountered in many return address prediction mechanisms is that the return address storage may overflow if subroutines are nested too deeply. For example, if X is the number of call instructions in a particular code segment, Y is the number of return instructions in that segment, and Z is the number of return address storage locations in the return address storage, the return address storage may overflow if $X-Y>Z$. Typically, when the return address storage overflows, the oldest stored return address is overwritten. Thus, whenever the return instruction that corresponds to the overwritten entry is detected, the return address prediction mechanism may not be able to correctly predict the return address. As a result, return address prediction may suffer if the return address storage overflows.

SUMMARY

Various embodiments of methods and systems for implementing a return address prediction mechanism in a microprocessor are disclosed. In one embodiment, a return address prediction mechanism includes a return storage and a controller. The return storage may include one or more entries. One of the entries may include a count and a first return address that corresponds to a recently detected call operation. The controller may be coupled to the return storage and configured to receive a new return address that corresponds to a call instruction. The controller may be configured to compare the new return address to the return address stored in the entry. If the new return address equals the return address in the entry, the controller may be configured to increase the value of the count in the entry instead of allocating a new entry to the new return address. In contrast, if the new return address does not equal the return address in the entry, the controller may be configured to allocate a new entry for the new return address. Additionally, if the new return address equals the return address in the entry and the value of the count equals a maximum count value, the controller may be configured to allocate a new entry for the new return address. When allocating a new entry to the new return address, the controller may be configured to initialize a count in the new entry to a minimum count value.

In some embodiments, the return storage may be implemented as a stack structure. A top of stack pointer may identify the next entry to use when predicting a return address. The controller may be configured to compare each new return address to the return address stored in the entry identified by the top of stack pointer. If the controller allocates a new entry, the controller may modify the top of stack pointer so that it identifies the new entry. The controller may be configured save a copy of a current value of the top of stack pointer whenever a branch prediction is made. The controller may also save a copy of the value of the count in the entry at the top of the stack. If the branch prediction is incorrect, the controller may restore the stored value of the pointer to the top of the stack and/or the stored value of the count.

In several embodiments, each entry in the return storage may include a respective count. However, fewer than all of the entries in the return storage may include a respective count in some embodiments.

In response to a return instruction being detected, the controller may be configured to provide the most recently detected return address as a predicted return address. Additionally, the controller may be configured to decrease a value of the count associated with the entry storing the most recently detected return address. If the value of the count associated with the most recently detected return address is equal to a minimum value after being decreased, the controller may be configured to remove the most recently detected return address's entry from the return storage.

In another embodiment, a method of predicting return addresses involves detecting a call instruction in an instruction stream, comparing a first return address stored in a first entry in a return storage to a second return address that is associated with the call instruction, and if the first return address equals the second return address, increasing a first count associated with the first entry. If the second return address does not equal the first return address, a second entry in the return storage may be allocated to the second return address.

Figure 1:
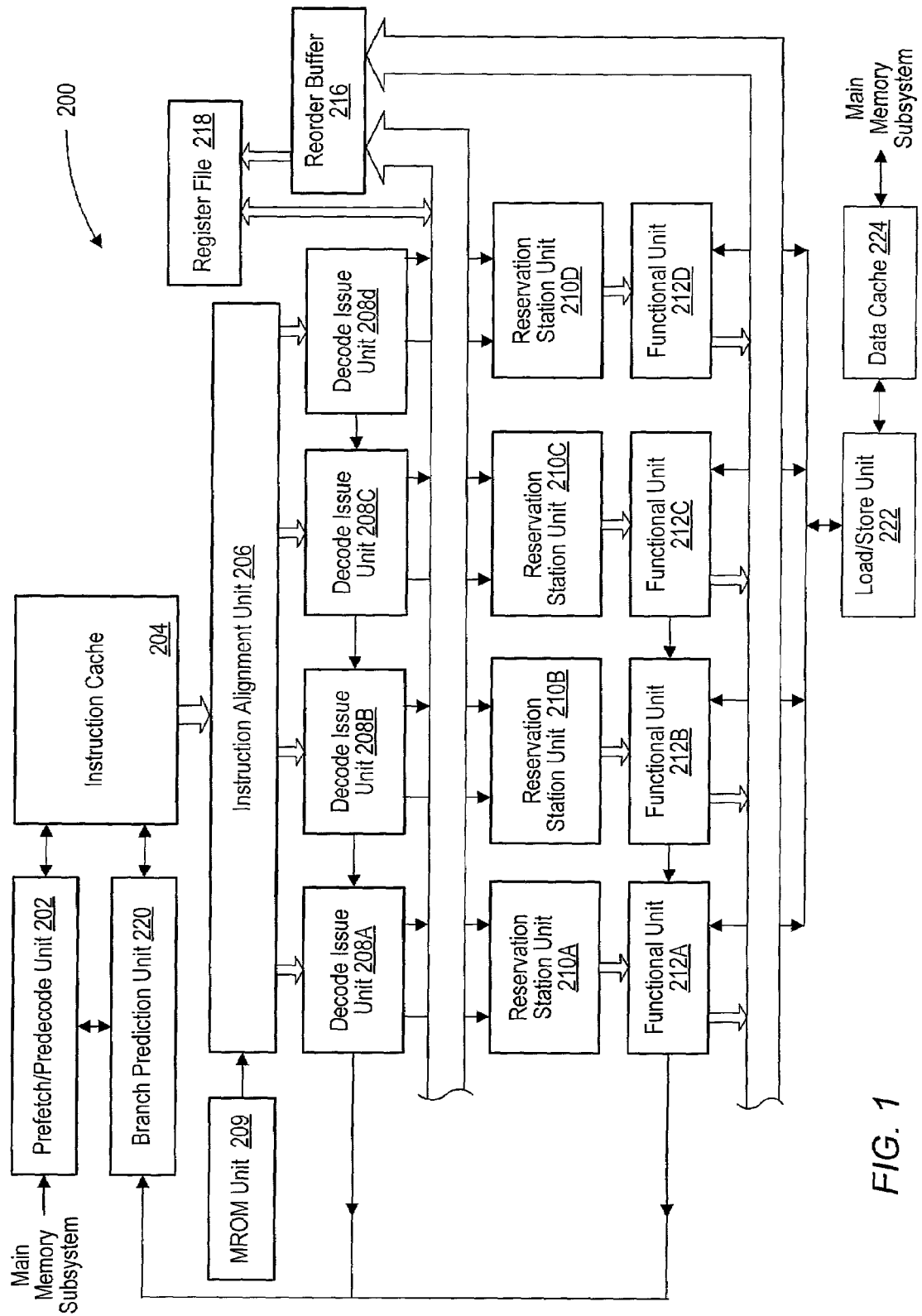
FIG. 1 shows one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly connected."

DETAILED DESCRIPTION OF EMBODIMENTS

FIG. 1—Microprocessor

FIG. 1 is a block diagram of one embodiment of a superscalar microprocessor 200 that may include a return address prediction mechanism. Before proceeding with a detailed description of the return address prediction mechanism employed within microprocessor 200, general aspects regarding other subsystems employed within the exemplary superscalar microprocessor 200 of FIG. 1 will be described.

Superscalar microprocessor 200 may include a prefetch/predecode unit 202 and a branch prediction unit 220 coupled to an instruction cache 204. An instruction alignment unit 206 may be coupled between instruction cache 204 and a plurality of decode units 208A–208D (referred to collectively as decode units 208). Each decode unit 208A–208D may be coupled to a respective reservation station unit 210A–210D (referred to collectively as reservation stations 210), and each reservation station 210A–210D may be coupled to a respective functional unit 212A–212D (referred to collectively as functional units 212). Decode units 208, reservation stations 210, and functional units 212 may also be coupled to a reorder buffer 216, a register file 218 and a load/store unit 222. A data cache 224 may be coupled to load/store unit 222, and a microcode unit 209 may be coupled to instruction alignment unit 206. In one embodiment, the microprocessor 200 may be designed to be compatible with the x86 architecture.

Instruction cache 204 may temporarily store instructions prior to their dispatch to decode units 208. Instruction code may be provided to instruction cache 204 by prefetching code from a main memory (not shown) through prefetch/predecode unit 202. Instruction cache 204 may be implemented in a set-associative, a fully-associative, or a direct-mapped configuration.

Prefetch/predecode unit 202 may prefetch instruction code from the main memory for storage within instruction cache 204. In one embodiment, prefetch/predecode unit 202 may be configured to burst code from the main memory into instruction cache 204. Prefetch/predecode unit 202 may employ a variety of specific code prefetching techniques and algorithms.

In the embodiment shown in FIG. 1, each of the decode units 208 may include decoding circuitry for decoding certain instructions. Some instructions may be directly decoded by decode units 208. The remaining instructions may be executed by invoking microcode unit 209. For example, when a microcoded instruction is encountered, microcode unit 209 may parse and serialize the instruction into a series of instructions that can be directly decoded by decode unit 208. In addition, each decode unit 208A–208D may route displacement and immediate data to a corresponding reservation station unit 210A–210D. Output signals from the decode units 208 may include bit-encoded execution instructions for the functional units 212 as well as operand address information, immediate data and/or displacement data.

The superscalar microprocessor of FIG. 1 supports out of order execution. Reorder buffer 216 may keep track of the original program sequence for register read and write operations, facilitate register renaming, allow for speculative instruction execution and branch misprediction recovery, and facilitate precise exceptions. It is noted that in some embodiments, the functionality of the reorder buffer 216 may be distributed among other microprocessor components, such as reservation stations 210. Upon decode of an instruction that involves the update of a register, a temporary storage location within reorder buffer 216 may be reserved to store speculative register states (or, if some of the functionality of the reorder buffer 216 is distributed among the other microprocessor components, a register renaming map may be used to store speculative register states). In some embodiments, reorder buffer 216 may be implemented in a first-in-first-out configuration wherein speculative results move to the "bottom" of the buffer as they are validated and written to the register file, thus making room for new entries at the "top" of the buffer. By storing speculative register states until the instructions that generated those states are validated, the results of speculatively-executed instructions along a mispredicted path may be invalidated in the buffer before they are written to register file 218 if a branch prediction is incorrect.

The bit-encoded execution instructions and immediate data provided at the outputs of decode units 208A–208D may be routed directly to respective reservation station units 210A–210D. In one embodiment, each reservation station unit 210A–210D may be capable of holding instruction information (e.g., bit encoded execution bits as well as operand values, operand tags and/or immediate data) for several pending instructions awaiting issue to the corresponding functional unit. Instructions aligned and dispatched through decode unit 208A may be passed to reservation station unit 210A and subsequently to functional unit 212A for execution. Similarly, instructions aligned and dispatched to decode unit 208B may be passed to reservation station unit 210B and into functional unit 212B, and so on. It is noted that while the embodiment of FIG. 1 shows that decode units 208A–208D are each associated with a dedicated reservation station unit 210A–210D, and that each reservation station unit 210A–210D is similarly associated with a dedicated functional unit 212A–212D, other configurations are possible. For example, in one embodiment, a single reservation station or scheduler may schedule operations for all of the functional units. In such an embodiment, the integrated scheduler may incorporate all or some of the functionality provided by reorder buffer 216.

Upon decode of a particular instruction, if a required operand is a register location, register address information may be routed to reorder buffer 216 (or, in an alternative embodiment, to a register renaming map) and register file 218. The register file 218 may contain the architected registers of the microprocessor. For example, in the x86 architecture, the x86 register file includes eight 32-bit real registers (e.g., EAX, EBX, ECX, EDX, EBP, ESI, EDI and ESP). Reorder buffer 216 (or a register renaming map) may contain temporary storage locations for results that change the contents of these registers, allowing out of order execution. A temporary storage location of reorder buffer 216 is reserved for each instruction which, upon decode, is determined to modify the contents of one of the real registers. Therefore, at various points during execution of a particular program, reorder buffer 216 may have one or more locations that contain the speculatively executed contents of a given register. Following decode of a given instruction, it may be determined that reorder buffer 216 has a previous location or locations assigned to a register used as an operand in the given instruction. If so, the reorder buffer 216 may forward to the corresponding reservation station either: 1) the value in the most recently assigned location, or 2) a tag for the most recently assigned location if the value has not yet been produced by the functional unit that will eventually execute the previous instruction. If the reorder buffer 216 has a location reserved for a given register, the operand value (or tag) may be provided from reorder buffer 216 rather than from register file 218. If there is no location reserved for a required register in reorder buffer 216, the value may be taken directly from register file 218. If the operand corresponds to a memory location, the operand value may be provided to the reservation station unit through load/store unit 222.

Reservation station units 210A–210D may be provided to temporarily store instruction information to be speculatively executed by the corresponding functional units 212A–212D. As stated previously, each reservation station unit 210A–210D may store instruction information for up to three pending instructions. Each of the four reservation stations 210A–210D may contain locations to store bit-encoded execution instructions to be speculatively executed by the corresponding functional unit and the values of operands to be operated on by those instructions. If a particular operand is not available, a tag for that operand may be provided from reorder buffer 216 and stored within the corresponding reservation station until the result has been generated (e.g., by completion of the execution of a previous instruction). It is noted that when an instruction is executed by one of the functional units 212A–212D, the result of that instruction may be passed directly to any reservation station units 210A–210D that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210D has been tagged with a location of a previous result value within reorder buffer 216 that corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 may maintain data coherency in situations where read-after-write dependencies occur.

In one embodiment, each of the functional units 212 may be configured to perform integer arithmetic operations of addition and subtraction, as well as shifts, rotates, logical operations, and branch operations. A floating point unit (not shown) may also be used to accommodate floating point operations.

Each of the functional units 212 may also provide information regarding the execution of conditional branch instructions to the branch prediction unit 220. If a branch prediction was incorrect, branch prediction unit 220 flushes instructions subsequent to the mispredicted branch that have entered the instruction processing pipeline and redirects prefetch/predecode unit 202. The redirected prefetch/predecode unit 302 may then begin fetching the correct set of instructions from instruction cache 204 or main memory. In such situations, the results of instructions in the original program sequence that occurred after the mispredicted branch instruction may be discarded, including those which were speculatively executed and temporarily stored in load/store unit 222 and reorder buffer 216.

Results produced by functional units 212 may be sent to the reorder buffer 216 if a register value is being updated or to the load/store unit 222 if the contents of a memory location are being changed. If the result is to be stored in a register, the reorder buffer 216 may store the result in the location that was reserved for the value of the register when the instruction was decoded. As stated previously, results may also be broadcast to reservation station units 210A–210D where pending instructions may be waiting for the results of previous instruction executions to obtain the required operand values.

Generally speaking, load/store unit 222 provides an interface between functional units 212A–212D and data cache 224. In one embodiment, load/store unit 222 may be configured with a load/store buffer with several storage locations for data and address information for pending loads or stores. Decode units 208 arbitrate for access to the load/store unit 222. If the buffer is full, a decode unit may wait until the load/store unit 222 has room for the pending load or store request information. The load/store unit 222 may also perform dependency checking for load instructions against pending store instructions to ensure that data coherency is maintained.

Data cache 224 is a high speed cache memory provided to temporarily store data being transferred between load/store unit 222 and the main memory subsystem. Like the instruction cache 204 described above, the data cache 224 may be implemented in a variety of specific memory configurations, including a set associative configuration. Additionally, data cache 224 and instruction cache 204 may be implemented in a unified cache in some embodiments.

Figure 2:
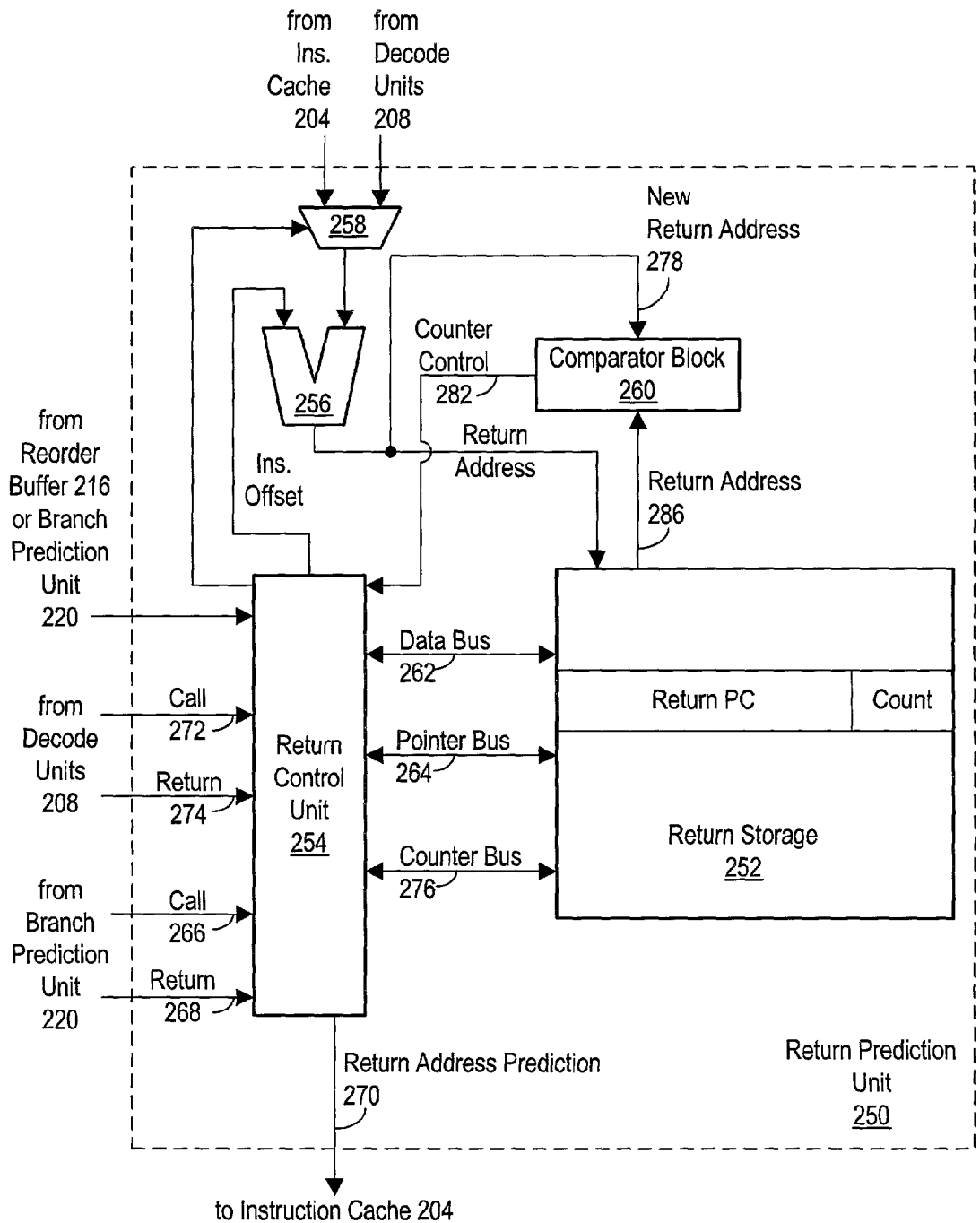
FIG. 2 is a block diagram of one embodiment of a return address prediction mechanism.
Figure 3A:
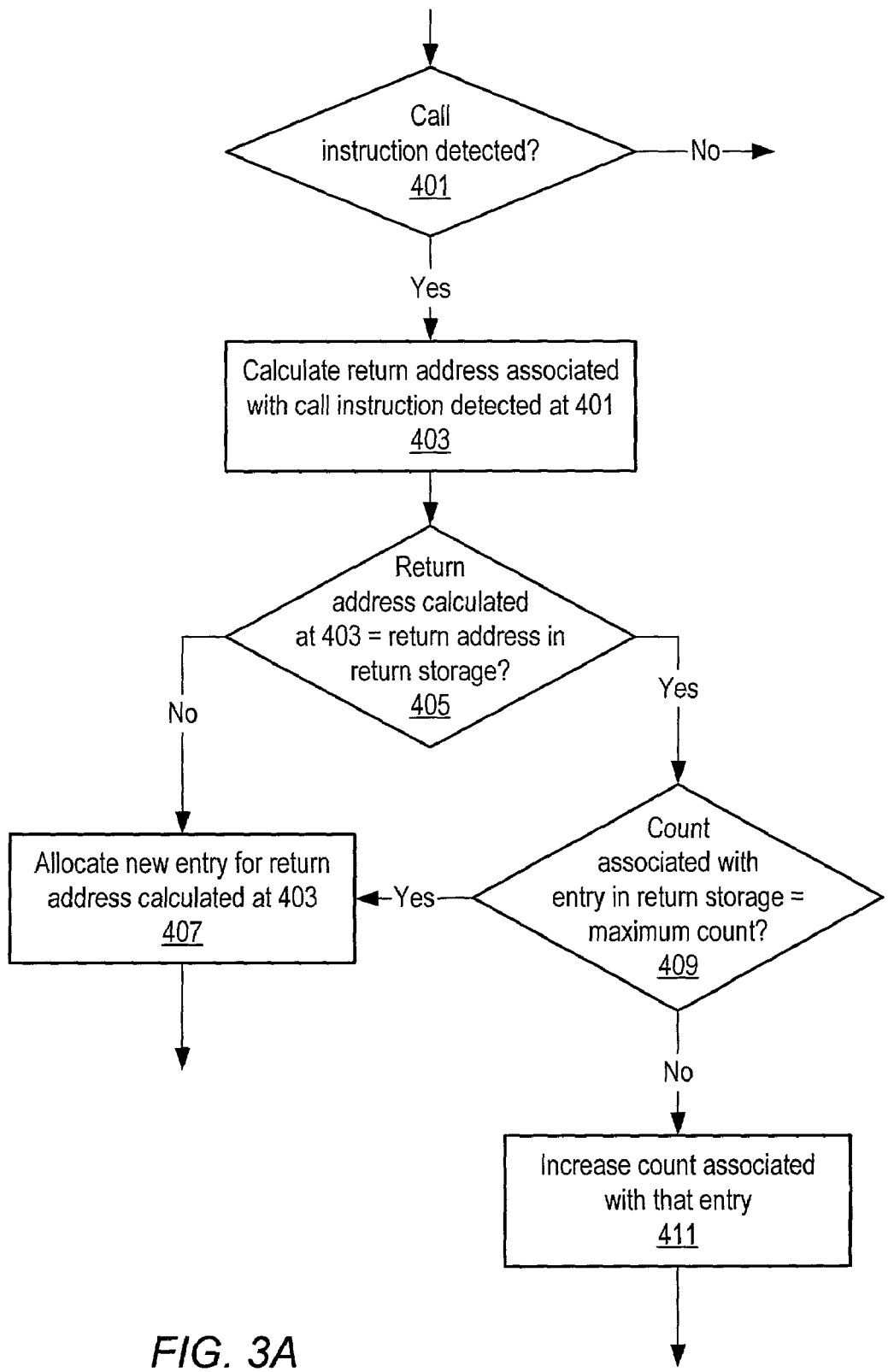
FIG. 3A is a flowchart showing one embodiment of a method of saving return addresses in response to detecting a call instruction in an instruction stream.
Figure 3B:
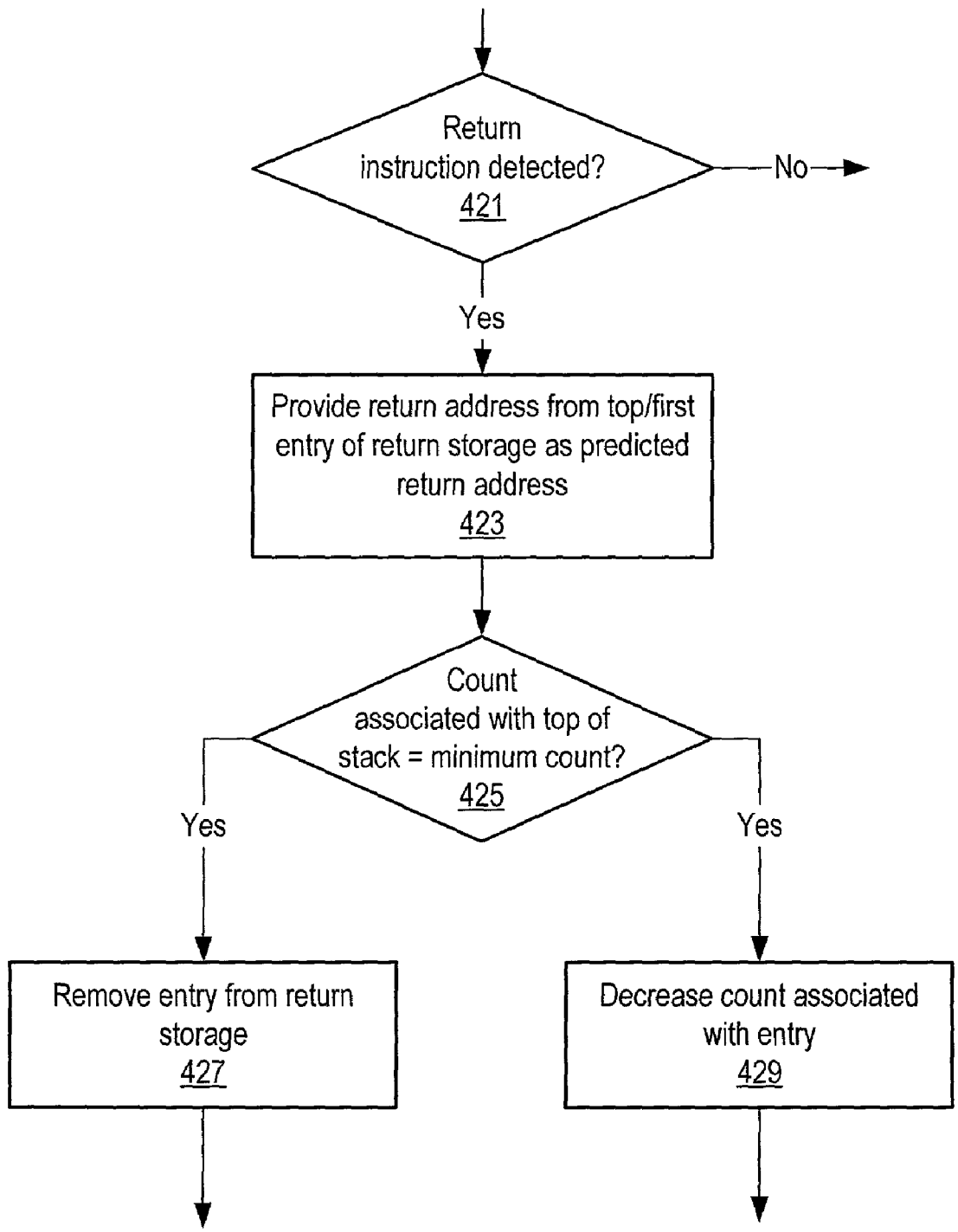
FIG. 3B shows one embodiment of a method of providing a predicted return address in response to detecting a return instruction.
Figure 3C:
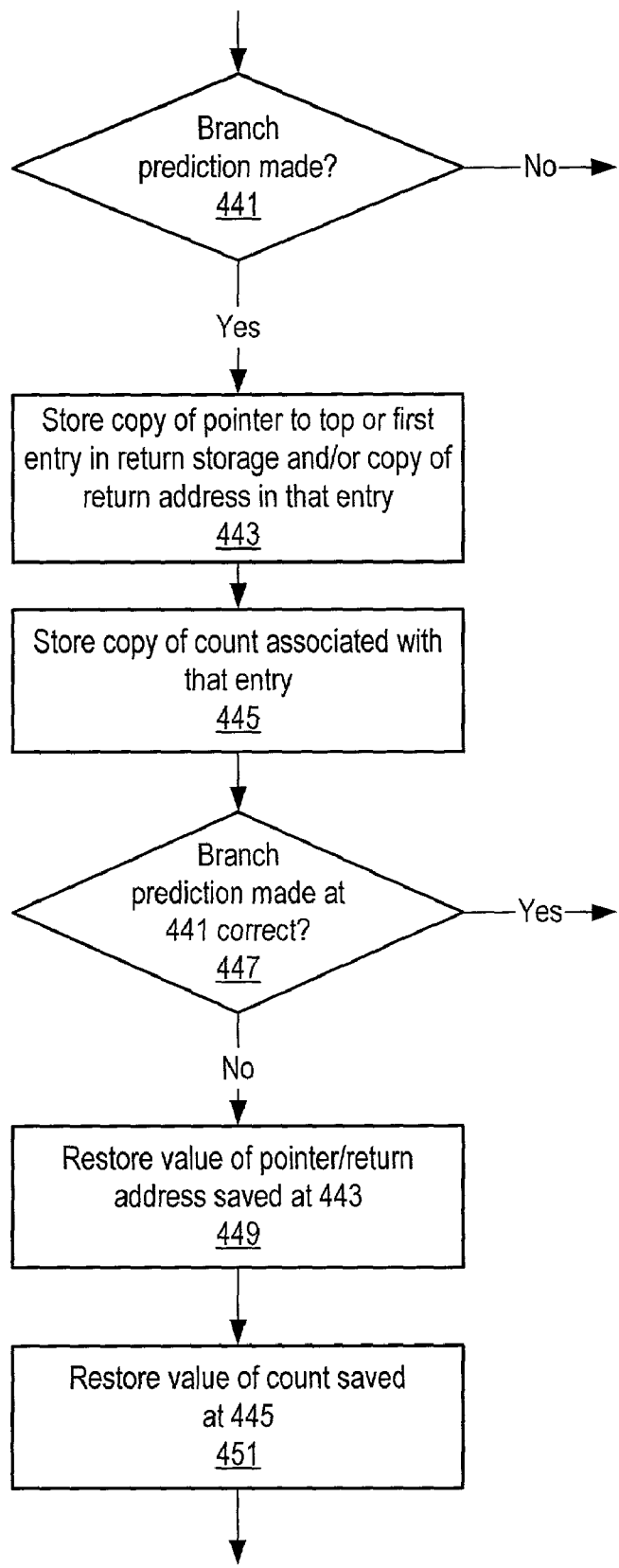
FIG. 3C is a flowchart illustrating one embodiment of a method of checkpointing to prevent a return address prediction mechanism from being corrupted by mispredicted branches.
Figure 4:
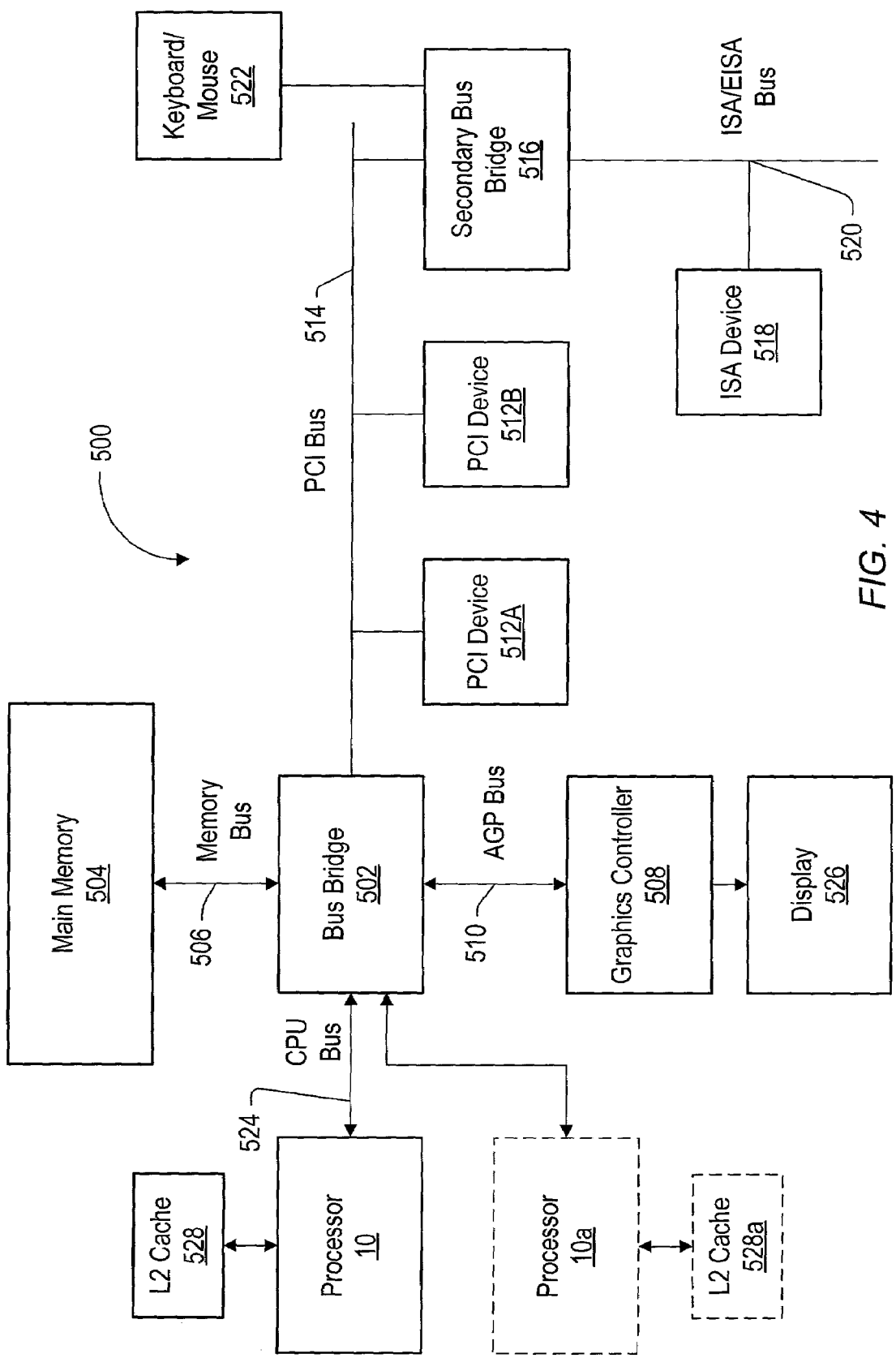
FIG. 4 shows an example of one embodiment of a computer system that may include a return address prediction mechanism.

FIGS. 2–4—Return Address Prediction Mechanism

Turning now to FIG. 2, one embodiment of a return prediction unit 250 is shown. In some embodiments of microprocessor 200, return prediction unit 250 may be included within branch prediction unit 220. Generally, return prediction unit 250 may be configured to provide return address predictions for return instructions as they are detected. In embodiments of microprocessor 200 employing the x86 microprocessor architecture, return instructions include the RET instruction and the IRET instruction. Generally, the term "return instruction" may refer to any instruction that causes a subroutine to return to a calling program.

Return prediction unit 250 stores return addresses associated with call instructions within return storage 252, and predicts the return address associated with a return instruction based on the stored return addresses. It is noted that in embodiments of microprocessor 200 employing the x86 microprocessor architecture, call instructions include the CALL instruction and the INT instruction.

It is noted that return storage 252 may employ multiple registers as its storage locations, or the storage locations may be rows of a storage array. Each entry in the return storage 252 may include a return address (e.g., a return program counter (PC)) and a count. The return address is the return address associated with the call instruction associated with the return stack entry. The count indicates how many times a particular return address should be provided as a predicted return address. For example, many recursive subroutines reuse the same call site. In a typical return stack, each time a recursive subroutine calls itself, a new entry is pushed onto the return stack. In contrast, instead of allocating a new entry for each recursive call, the return prediction unit 250 may increase the count associated with the return address for the recursive subroutine each time a recursive call (i.e., a call that has the same predicted return address as the previously detected call) is detected. Including a count in a return storage entry may increase the effective size of the return storage 252 if nested subroutine calls are encountered. Increasing the effective size of the return storage 252 may in turn decrease the likelihood of the return storage 252 overflowing.

In many embodiments, the return storage 252 may be implemented as a stack structure. Generally, a stack structure is a Last-In, First-Out (LIFO) structure in which values are placed on the stack in a certain order and are removed from the stack in the reverse order. Therefore, the top of the stack contains the last item placed on the stack. The action of placing a value on the stack is known as a "push," and requesting that a push be performed is a "push command." Similarly, the action of removing a value from the stack is referred to as a "pop," and requesting that a pop be performed is a "pop command." When a push command is performed, the pointer to the top of the stack may be decremented by the size (in bytes) of the value specified by the push command. The value is then stored at the address pointed to by the decremented pointer value. When a pop command is performed, a number of bytes specified by the pop command are copied from the top of the stack to a destination specified by the pop command, and then the pointer to the top of the stack may be incremented by the number of bytes.

In some embodiments, the return storage 252 may be implemented as a linked list structure. A pointer may indicate which entry should be used to provide the next predicted return address, and each entry may maintain one or more pointers to the next entries that should be used to predict return addresses. In one embodiment, each entry may include several pointers that each correspond to a value of that entry's count. For example, if an entry being used to provide a predicted return address has a current count of three (e.g., indicating that the entry should be used to provide a return address three times), the entry may be used to provide the return address and the count may be decremented to two. The third pointer in that entry may be used to identify the next entry in the list, and thus that pointer may now be used as the pointer to the first entry of the linked list. Similarly, if that entry is later used to provide a predicted return address again, its count may be decremented to one and the second pointer in that entry may identify the next entry to be used. In such an embodiment, nonconsecutive subroutine calls that use the same return address may be stored together in a single entry, increasing the effective size of return storage 252. Generally, the larger the size of the return addresses, the more such an embodiment may increase the effective size of return storage 252. In alternative embodiments, the order in which the return storage entries should be used to predict return addresses may be maintained in a separate stack structure whose entries each store tags that identify entries in the return storage 252. The order of the tags in this other stack structure may indicate the order in which the entries in return storage 252 should be accessed.

Return prediction unit 250 may also include a return control unit 254, an adder circuit 256, a multiplexer 258, and a comparator block 260. Return control unit 254 is configured to control the storage of data within return storage 252. Adder circuit 256 and multiplexer 258 may be configured to generate a return address for a particular call instruction during a clock cycle in which the call instruction is detected. Comparator block 260 compares the value of the return address generated by adder circuit 256 to one or more of the addresses already stored in return storage 252 in order to determine whether to increase a particular entry's count or to allocate a new entry when a call instruction is detected by the instruction cache 204 or decode units 208.

Return control unit 254 may be coupled to return storage 252 via a data bus 262, a pointer bus 264, and a counter bus 276. Data bus 262 allows the reading and writing of data into each of the storage locations (or entries) within return storage 252. Control signals conveyed along with the data upon data bus 262 may indicate a read or write operation as well as which entry or entries are selected for the indicated operation. Pointer bus 264 may convey a pointer indicative of the "top" or "first" entry or storage location in return storage 252. The top or first entry of return storage 252 may be the entry within return storage 252 that contains the most recently allocated call instruction data. In some embodiments, the entry above the entry indicated by pointer 264 may not contain valid data. The count bus 276 may allow the control of the count in each return entry. Control signals transmitted along the count bus may be used to identify one or more of the entries and to cause the count(s) associated with each selected entry to be increased, decreased, cleared, etc. For example, if the count is maintained in a counter, the control signals may cause the counter to be incremented, decremented, or reset. Similarly, if the count is maintained in a shift register, the control signals may cause bits to be shifted into or out of the shift register.

Additionally, return control unit 254 receives a plurality of buses from other units within microprocessor 200. A call bus 266 and a return bus 268 may convey call and return signals from branch prediction unit 220. When asserted, the call and return signals indicate that a call and return instruction (respectively) has been detected by branch prediction unit 220. Call and return instructions may be stored as predicted branches within the branch prediction structure, along with an indication that the instruction is a call or return instruction. The branch prediction structure may include a plurality of storage locations indexed by the instruction fetch address. Branches and call instructions may be detected according to information stored in each entry and predicted according to that information. If a call instruction is detected within a set of instructions fetched by instruction cache 204, then the call signal may be asserted to return prediction unit 250. Similarly, if a return instruction is detected within a set of instructions fetched by instruction cache 204, then the return signal may be asserted to return prediction unit 250.

Upon receipt of the asserted call signal from branch prediction unit 220, return control unit 254 may either allocate an entry to the call instruction or, if the predicted return address for that call instruction is the same as a return address already contained in the return storage 252, increase the count associated with that entry. For example, if the return storage 252 is implemented as a stack, the new return address may be compared to the return address at the top of the stack. If the new return address equals the return address at the top of the stack, the count associated with the top of the stack may be increased instead of allocating a new entry at the top of the stack.

The return address may be calculated by adder circuit 256 from the offset of the call instruction within the fetched line (the offset is transferred to return control unit 254 from branch prediction unit 220 upon call bus 266) and from the address being fetched (transferred to multiplexer 258 from instruction cache 204). Multiplexer 258 may be controlled by return control unit 254 to select the address conveyed by instruction cache 204 in this case. Comparator block 260 compares the return address calculated by the adder circuit 256 to the return address contained in one or more of the entries in the return storage 252 (e.g., in a return stack embodiment, the comparator block 260 may compare the new return address to the return address contained in the top entry in the stack). If the two return addresses are the same, comparator block 260 provides a signal to the return control unit 254 indicating their equality and the return control unit 254 asserts a signal on the count bus 276 that increases the count associated with the entry that already contains a copy of that return address. If the two addresses are not the same, return control unit 254 may allocate a new entry in the return storage 252. The allocated entry is determined according to the pointer on pointer bus 264, and the entry becomes the top or first entry in the return storage 252. The return address calculated by the adder circuit 256 is stored into the allocated entry within return storage 252. Additionally, the count associated with the new entry may be initialized to a value indicating that the return address should be provided one time before being removed from the return storage 252.

In one embodiment, if the count associated with a return address reaches its maximum value (e.g., the largest value the count is capable of indicating), the control unit 254 may be configured to allocate a new entry the next time a call instruction that has that return address is detected.

Upon receipt of the asserted return signal from branch prediction unit 220, return control unit 254 predicts a return address for the return instruction. The return address may be predicted to be the return address stored within the entry nearest the top or first entry in the return storage 252 (as indicated by the pointer upon pointer bus 264). The selected return address may be conveyed upon return address prediction bus 270 to instruction cache 204 for use in fetching subsequent instructions.

The number of times a particular return address is provided as a predicted return address depends on the value of the count associated with the entry storing that return address. If the count indicates that the return address should be provided once, the return address's entry may be removed from the return storage the first time that return address is used as a predicted return address. On the other hand, if the count indicates that the return address should be provided several times, the control unit 254 may decrease the count each time that return address is provided instead of removing its entry from the return storage 252. The control unit may not remove the return address from the return storage 252 until its count indicates that it has been provided the specified number of times.

Looking back at FIG. 1, it is noted that the branch prediction structure within branch prediction unit 220 is a speculative structure that may not store an indication for each call or return instruction that may be encountered. In one embodiment, an indication of whether or not a particular call or return instruction was detected by branch prediction unit 220 may be conveyed with each call and return instruction through the instruction processing pipeline of microprocessor 200. When a decode unit 208 decodes a call or return instruction and the associated indication signifies that the instruction was not detected by branch prediction unit 220, then the decode unit may assert a call signal upon a decode call bus 272 or a decode return bus 274 to return prediction unit 250. During a clock cycle in which these signals are asserted, the instruction fetching portion of the instruction processing pipeline within instruction cache 204 and instruction alignment unit 206 may be stalled.

When decode units 208 decode a call or return instruction not detected by branch prediction unit 220, return control unit 254 may allocate or remove an entry or increase or decrease a count for the detected call or return instruction just as it would for call or return instructions detected by branch prediction unit 220. Multiplexer 258 may be directed to accept the PC address from decode units 208 in the case of a call instruction so that the return address for the instruction may be calculated. The instruction offset may be calculated according to the particular decode unit 208 which decodes the call or return instruction. The offset may be conveyed by that decode unit to return control unit 254.

Entries may be removed from the return storage 252 in several ways. In one embodiment, the contents of storage locations within return storage 252 between the storage location indicated by pointer bus 264 and the storage location just before the one being deleted may be copied to the next lower storage location. In other words, storage locations between the storage location indicated by pointer bus and the storage location before the one being deleted may be shifted down by one location. The storage location is thereby overwritten by another entry and is deleted from return storage 252.

Because microprocessor 200 is configured to speculatively execute instructions out of order, branch mispredictions may indicate that portions of return storage 252 are storing incorrect information. As used herein, the term "mispredicted branch" refers to a branch, call, or return instruction for which the target address has been mispredicted. A branch may be mispredicted because the speculatively generated target address is incorrect. Additionally, a branch may be mispredicted because it was predicted to be taken (i.e., the next instruction to be executed resides at the target address) and the branch is found to be not taken. Alternatively, a branch may be mispredicted because it was predicted to be not taken (i.e., the next instruction to be executed resides in memory contiguous to the branch instruction) and the branch is found to be taken.

When a branch instruction is mispredicted, information associated with instructions within the instruction processing pipeline that are subsequent to the mispredicted branch may be incorrect. As noted above, the instructions subsequent to the mispredicted branch are flushed from the pipeline. Return storage 252 may be purged of information related to the flushed instructions. In some embodiments, purging information from the return storage 252 may simply involve invalidating all of the entries in the return storage 252.

In other embodiments, return prediction unit 250 may be configured to flush information from the return storage 252 without invalidating the entire storage. For example, in order to recover the contents of return storage 252 upon detection of a mispredicted branch, the return prediction unit 250 may employ a checkpointing mechanism to save certain contents of the return storage 252 before they are modified by the calls and returns in a predicted control path.

In some embodiments, saving the contents of the return storage 252 may involve saving a copy of the current value of the pointer to the top or first entry in the return storage 252 and/or a copy of the return address stored in that entry. In a return stack embodiment of return storage 252, merely saving the current value of the pointer to the top or first entry may allow the return storage 252 to be restored as long as more call instructions than return instructions are detected in the mispredicted path (e.g., as long as more entries are pushed onto the stack than are popped off of the stack). However, if more entries are popped from the return stack than are pushed onto the return stack, the mispredicted path may corrupt the return storage 252. Additional protection against corruption may be provided by saving the value of the return address currently in the top or first entry whenever a branch prediction is detected.

Additionally, the current value of the count associated with the top or first entry may be saved as part of the checkpointing process. This prevents a mispredicted path from corrupting the count associated with that entry. So long as the mispredicted path does not alter any entries below or after the checkpointed entry, the return storage 252 may not be corrupted by the mispredicted path.

Thus, if portions of the return storage 252 are checkpointed when a branch prediction is made and the prediction turns out to be incorrect, the saved contents of the stack may be restored. For example, a misprediction signal upon branch misprediction conductor 278 may indicate that a mispredicted branch has been detected. Depending on the embodiment, the misprediction signal may be conveyed from branch prediction unit 220, reorder buffer 216, or functional unit 212 (note that in some embodiments, only one of these components may be configured to convey the misprediction signal to the return prediction unit 250). In response to receiving the misprediction signal, the control unit 254 may restore the saved contents of the return storage 252. As described above, this may effectively undo the effects of the speculation on the return storage 252 (depending on the modifications made to the return storage 252 in response to the call and return instructions detected along the mispredicted path). If the prediction is validated, the saved checkpointing information may be discarded.

It is noted that different embodiments may support numbers of outstanding branch predictions at any given time. For example, in one embodiment, the return prediction unit 250 may be able to checkpoint for several outstanding branch predictions, while another embodiment may only provide checkpointing for a single outstanding branch prediction. Also, some embodiments may provide additional repair mechanisms such as branch tags and validity indications. Branch tags may track which new entries were allocated in the return storage 252 or which preexisting entries were modified during any particular predicted path. Validity bits may allow "deleted" entries to be saved until the branch prediction resolves. This may provide additional protection against return storage corruption caused by a mispredicted path.

Instead of speculatively updating the return storage 252 (e.g., by updating before a branch prediction has resolved), the contents of the return storage 252 may be updated non-speculatively at retire time in some embodiments. Since the return storage is not speculatively updated, there may be no need to provide checkpointing. However, situations may arise where a call instruction is detected along a predicted path and the corresponding return instruction is encountered before the return storage has been updated based on the call instruction.

As noted earlier, in some embodiments, the entire return storage 252 may be invalidated when a mispredicted return instruction is detected. An additional situation where the entire storage may be invalidated is if the contents of instruction cache 204 are invalidated. For example, instruction cache 204 may be invalidated due to a task switch. Since the contents of return storage 252 may be invalid for the new task, the return storage's entries may be invalidated. The contents of the return storage 252 may also be invalidated if the return prediction unit 250 incorrectly predicts a return address (as determined when the return instruction for which the prediction was made completes execution).

Return storage 252 includes a finite number of entries, and may therefore become full before any entries are deleted. When a call instruction is detected and return storage 252 is full of valid entries, the oldest entry (e.g., the entry stored at the "bottom" of the stack or the end of a linked list) may be deleted. In one embodiment, the pointer upon pointer bus 254 may wrap around to the oldest storage location within return storage 252 and that location may be allocated to the newly detected call instruction. In another embodiment, all storage locations within return storage 252 may be shifted down one location (similar to when an entry is deleted due to return instruction retirement) and the top or first storage location may be allocated to the new return instruction. The pointer upon pointer bus 264 may be unmodified in this embodiment.

It is noted that certain instructions within various microprocessor architectures may generate an "exception." Like an interrupt, an exception causes program execution to jump to an exception handling routine. If an instruction generates an exception, the return storage 252 may be checkpointed as described above. It is further noted that, when multiple call and/or return instructions are detected simultaneously by decode units 208, return control unit 254 may be configured to select the first instruction detected in program order. The other call and/or return instructions may be purged from the instruction processing pipeline in response to the first instructions being detected.

Other embodiments of return address prediction unit 250 are contemplated in which call and return instructions are detected in decode units 208 but not in branch prediction unit 220. For this embodiment, functionality is similar to the above description with the exception of detection of call and return instructions in branch prediction unit 220.

In other embodiments of return storage 252, the return storage may include fewer counts than it does entries. For example, in a return stack embodiment, the return storage 252 may maintain three counts that respectively correspond to the three entries currently at the top of the return storage 252. In a similar embodiment, the return storage 252 may maintain a single count that corresponds to the top entry in the return stack.

In FIG. 3A, a flowchart illustrates one embodiment of a method for saving return addresses in a return address prediction mechanism. This flowchart illustrates how return addresses may be recorded in the return address prediction mechanism in response to call instructions being detected in an instruction stream. In response to a call instruction being detected at 401, the return address associated with the call instruction is calculated, as shown at 403. If the return address is not the same as one of the return addresses already stored in the return storage (e.g., in a return stack embodiment, the address stored in the return stack's top entry) as shown at 405, the return address may be added to the return storage, as shown at 407. If instead the return address equals one of the return addresses (e.g., the return address stored at the top of the stack) already stored in the return storage, the count associated with that entry may be increased, as shown at 411. In some embodiments, the decision between increasing a count or allocating a new entry may also depend on whether the count to be increased has reached its maximum value, as shown at 409. If the count is already equal to its maximum value, a new entry may be allocated for the return address.

FIG. 3B is a flowchart showing one embodiment of a method for providing predicted return addresses from a return address prediction mechanism. In response to detecting a return instruction in an instruction stream at 421, the return address contained in the entry at the top or first of the return storage is provided as the predicted return address, as shown at 423. If the count associated with that entry of the return stack equals its minimum value, indicating that the return address should not be provided as a predicted return address again, that entry may be removed from the return storage, as shown at 427. If the count indicates that the return address should be provided as a predicted return address additional times, the count may be decreased and the entry may remain in the return storage, as indicated at 429.

FIG. 3C shows one embodiment of a method of checkpointing a return storage that associates a count with a return address entry. At step 441–443, if a branch prediction is detected, a copy of the pointer to the current top or first entry in the storage may be saved. Additionally, copies of the return address and/or any other information contained in the top or first entry may be saved. At step 445, a copy of the count associated with the top or first entry may be saved. If the branch prediction is validated in step 447, the saved copies may go unused. However, if the branch is mispredicted, the copies saved at 443 and 445 may be restored, as shown at 449 and 451. Depending on the instructions that were executed along the mispredicted path, restoring these copies may effectively restore the return storage to the state it was in before the branch misprediction.

FIG. 4—Computer System

FIG. 4 shows a block diagram of one embodiment of a computer system 500 that includes a processor 10 coupled to a variety of system components through a bus bridge 502. Other embodiments of a computer system are possible and contemplated. In the depicted system, a main memory 504 is coupled to bus bridge 502 through a memory bus 506, and a graphics controller 508 is coupled to bus bridge 502 through an AGP bus 510. Several PCI devices 512A–512B are coupled to bus bridge 502 through a PCI bus 514. A secondary bus bridge 516 may also be provided to accommodate an electrical interface to one or more EISA or ISA devices 518 through an EISA/ISA bus 520. In this example, processor 10 is coupled to bus bridge 502 through a CPU bus 524 and to an optional L2 cache 528. In some embodiments, the processor 10 may include an integrated L1 cache (not shown).

Bus bridge 502 provides an interface between processor 10, main memory 504, graphics controller 508, and devices attached to PCI bus 514. When an operation is received from one of the devices connected to bus bridge 502, bus bridge 502 identifies the target of the operation (e.g., a particular device or, in the case of PCI bus 514, that the target is on PCI bus 514). Bus bridge 502 routes the operation to the targeted device. Bus bridge 502 generally translates an operation from the protocol used by the source device or bus to the protocol used by the target device or bus.

In addition to providing an interface to an ISA/EISA bus for PCI bus 514, secondary bus bridge 516 may incorporate additional functionality. An input/output controller (not shown), either external from or integrated with secondary bus bridge 516, may also be included within computer system 500 to provide operational support for a keyboard and mouse 522 and for various serial and parallel ports. An external cache unit (not shown) may also be coupled to CPU bus 524 between processor 10 and bus bridge 502 in other embodiments. Alternatively, the external cache may be coupled to bus bridge 502 and cache control logic for the external cache may be integrated into bus bridge 502. L2 cache 528 is shown in a backside configuration to processor 10. It is noted that L2 cache 528 may be separate from processor 10, integrated into a cartridge (e.g., slot 1 or slot A) with processor 10, or even integrated onto a semiconductor substrate with processor 10.

Main memory 504 is a memory in which application programs are stored and from which processor 10 primarily executes. A suitable main memory 504 comprises DRAM (Dynamic Random Access Memory). For example, a plurality of banks of SDRAM (Synchronous DRAM) or Rambus DRAM (RDRAM) may be suitable.

PCI devices 512A–512B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 518 is illustrative of various types of peripheral devices, such as a modem, a sound card, and a variety of data acquisition cards such as GPIB or field bus interface cards.

Graphics controller 508 is provided to control the rendering of text and images on a display 526. Graphics controller 508 may embody a typical graphics accelerator generally known in the art to render three-dimensional data structures that can be effectively shifted into and from main memory 504. Graphics controller 508 may therefore be a master of AGP bus 510 in that it can request and receive access to a target interface within bus bridge 502 to thereby obtain access to main memory 504. A dedicated graphics bus accommodates rapid retrieval of data from main memory 504. For certain operations, graphics controller 508 may further be configured to generate PCI protocol transactions on AGP bus 510. The AGP interface of bus bridge 502 may thus include functionality to support both AGP protocol transactions as well as PCI protocol target and initiator transactions. Display 526 is any electronic display upon which an image or text can be presented. A suitable display 526 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 500 may be a multiprocessing computer system including additional processors (e.g., processor 10a shown as an optional component of computer system 500). Processor 10a may be similar to processor 10. More particularly, processor 10a may be an identical copy of processor 10. Processor 10a may be connected to bus bridge 502 via an independent bus (as shown in FIG. 4) or may share CPU bus 524 with processor 10. Furthermore, processor 10a may be coupled to an optional L2 cache 528a similar to L2 cache 528.

Figure 5:
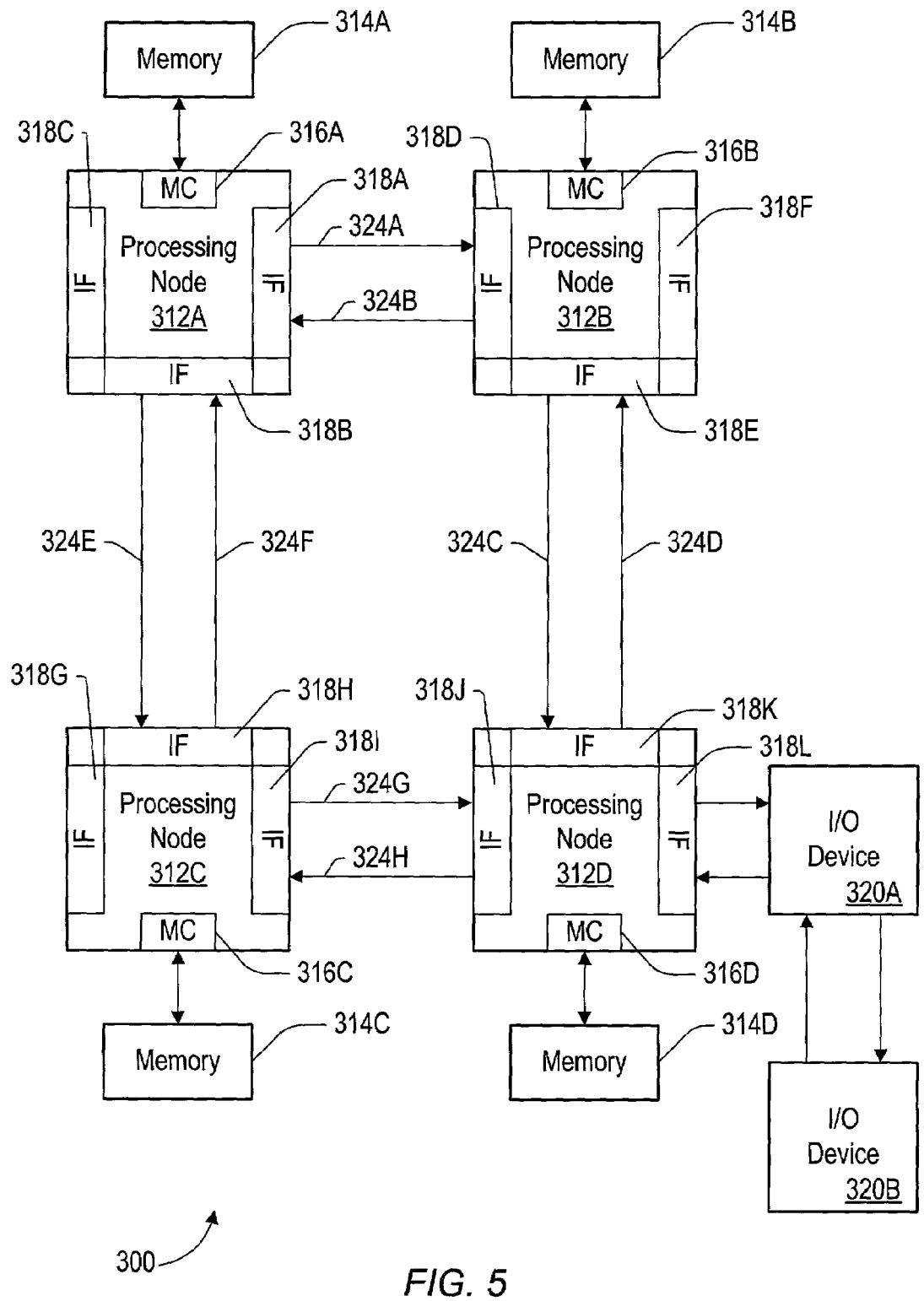
FIG. 5 shows another embodiment of a computer system that may include a return address prediction mechanism.

FIG. 5—Multi-node Processing System

Turning now to FIG. 5, another embodiment of a computer system 300 is shown. Other embodiments are possible and contemplated. In the embodiment of FIG. 5, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g., devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g., lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 5. Generally, each set of lines 324 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 5. Any suitable routing algorithm may be used. Other embodiments of computer system 300 may include more or fewer processing nodes then the embodiment shown in FIG. 5.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10. External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicate with another computer system to which the devices may be coupled (e.g., network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the term "clock cycle" refers to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

The above discussion describes signals as being "asserted". A signal may be defined as being asserted when it conveys a value indicative of a particular piece of information. A particular signal may be defined to be asserted when it conveys a binary one value or, alternatively, when it conveys a binary zero value.

Numerous variations and modifications will become apparent to those skilled in the art once the above disclosure is fully appreciated. It is intended that the following claims be interpreted to embrace all such variations and modifications.

What is claimed is:

1. A microprocessor, comprising:
an instruction cache configured to fetch instructions for execution; and
a return prediction unit coupled to said instruction cache, wherein said return prediction unit comprises:
a return storage including a first entry configured to store a count value and a return address of a previously detected call instruction; and
a controller coupled to the return storage and configured to compare the return address stored in the first entry to a new return address of a subsequently detected call instruction, and in response to determining that the stored return address is the same as the new return address, to modify the count value to indicate that the stored return address corresponds to more than one call instruction;
wherein if the count value indicates that the stored return address corresponds to more than one call instruction, the controller is configured to provide a predicted return address to the instruction cache for fetching by providing the stored return address and correspondingly modifying the count value.

2. The microprocessor as recited in claim 1, wherein in response to determining that the return address stored in the first entry is the same as the new return address, the controller is configured to modify the count value without allocating a new entry within the return storage.

3. The microprocessor as recited in claim 1, wherein the controller is configured to modify the count value to indicate that the stored return address corresponds to more than one call instruction by increasing the count value.

4. The microprocessor as recited in claim 1, wherein if the count value indicates that the stored return address corresponds to more than one call instruction, the controller is configured to correspondingly modify the count value by decreasing the count value.

5. The microprocessor as recited in claim 1, wherein if the new return address is not the same as the stored return address, the controller is configured to allocate a new entry within the return storage for the new return address.

6. The microprocessor as recited in claim 5, wherein the new entry is configured to store a count value and wherein the controller is configured to initialize the count value of the new entry to a minimum count value.

7. The microprocessor as recited in claim 1, wherein if the new return address is the same as the stored return address and the count value equals a maximum count value, the controller is configured to allocate a new entry within the return storage for the new return address.

8. The microprocessor as recited in claim 1, wherein the return storage is implemented as a stack structure, and wherein the first entry is identified by a top of stack pointer.

9. The microprocessor as recited in claim 8, wherein if the new return address is not the same as the stored return address, the controller is configured to allocate a new entry for the new return address and to modify the top of stack pointer to identify the new entry.

10. The microprocessor as recited in claim 8, wherein in response to a branch prediction being made, the controller is configured to save a copy of a current value of the top of stack pointer.

11. The microprocessor as recited in claim 10, wherein the controller is further configured to save a copy of the count value associated with the first entry if the first entry is identified by the top of stack pointer when the branch prediction is made.

12. The microprocessor as recited in claim 1, wherein each entry in the return storage is configured to store a respective count value.

13. The microprocessor as recited in claim 1, wherein fewer than all entries in the return storage are configured to store a respective count value.

14. The microprocessor as recited in claim 1, wherein the controller is further configured to provide the predicted return address to the instruction cache for fetching in response to a return instruction being detected.

15. The microprocessor as recited in claim 14, wherein if the count value associated with the stored return address is equal to a minimum value after being correspondingly modified, the controller is further configured to remove the first entry from the return storage.

16. The microprocessor as recited in claim 1, wherein if the count value indicates that the stored return address corresponds to a single call operation, the controller is configured to provide the return address by providing the stored return address and removing the first entry from the return storage.

17. A method, comprising:
storing a count value and a return address of a previously detected call instruction in a first entry of a return storage;
comparing the return address stored in the first entry to a new return address of a subsequently detected call instruction;
in response to determining that the stored return address is the same as the new return address, modifying the count value to indicate that the stored return address corresponds to more than one call instruction; and
if the count value indicates that the stored return address corresponds to more than one call instruction, providing a predicted return address for fetching by providing the stored return address and correspondingly modifying the count value.

18. The method as recited in claim 17, wherein modifying the count value to indicate that the stored return address corresponds to more than one call instruction occurs without allocating a new entry within the return storage.

19. The method as recited in claim 17, wherein modifying the count value to indicate that the stored return address corresponds to more than one call instruction includes increasing the count value.

20. The method as recited in claim 17, wherein correspondingly modifying the count value if the count value indicates that the stored return address corresponds to more than one call instruction includes decreasing the count value.

21. The method as recited in claim 17, further comprising allocating a new entry within the return storage for the new return address in response to determining that the stored return address is the same as the new return address.

22. The method as recited in claim 21, wherein the new entry is configured to store a count value and wherein the method further comprises initializing the count value of the new entry to a minimum count value.

23. The method as recited in claim 17, further comprising allocate a new entry within the return storage for the new return address in response to determining that the new return address is the same as the stored return address and the count value equals a maximum count value.

24. The method as recited in claim 17, wherein the return storage is implemented as a stack structure, and wherein the first entry is identified by a top of stack pointer.

25. The method as recited in claim 24, further comprising allocating a new entry for the new return address and modifying the top of stack pointer to identify the new entry in response to determining that the new return address is not the same as the stored return address.

26. The method as recited in claim 24, further comprising saving a copy of a current value of the top of stack pointer in response to a branch prediction being made.

27. The method as recited in claim 26, further comprising saving a copy of the count value associated with the first entry in response to determining that the first entry is identified by the top of stack pointer when the branch prediction is made.

28. The method as recited in claim 17, wherein providing the predicted return address to the instruction cache for fetching occurs in response to a return instruction being detected.

29. The method as recited in claim 28, further comprising removing the first entry from the return storage in response to determining that the count value associated with the stored return address is equal to a minimum value after being correspondingly modified.

30. A system, comprising:
a system memory; and
a microprocessor coupled to the system memory, wherein the microprocessor includes:
an instruction cache configured to fetch instructions for execution; and
a return prediction unit coupled to said instruction cache, wherein said return prediction unit comprises:
a return storage including a first entry configured to store a count value and a return address of a previously detected call instruction; and
a controller coupled to the return storage and configured to compare the return address stored in the first entry to a new return address of a subsequently detected call instruction, and in response to determining that the stored return address is the same as the new return address, to modify the count value to indicate that the stored return address corresponds to more than one call instruction;
wherein if the count value indicates that the stored return address corresponds to more than one call instruction, the controller is configured to provide a predicted return address to the instruction cache for fetching by providing the stored return address and correspondingly modifying the count value.

31. The system as recited in claim 30, wherein in response to determining that the return address stored in the first entry is the same as the new return address, the controller is configured to modify the count value without allocating a new entry within the return storage.

32. The system as recited in claim 30, wherein the controller is configured to modify the count value to indicate that the stored return address corresponds to more than one call instruction by increasing the count value.

33. The system as recited in claim 30, wherein if the count value indicates that the stored return address corresponds to more than one call instruction, the controller is configured to correspondingly modify the count value by decreasing the count value.

34. The system as recited in claim 30, wherein if the new return address is not the same as the stored return address, the controller is configured to allocate a new entry within the return storage for the new return address.

35. The system as recited in claim 30, wherein the return storage is implemented as a stack structure, wherein the first entry is identified by a top of stack pointer, and wherein if the new return address is not the same as the stored return address, the controller is configured to allocate a new entry for the new return address and to modify the top of stack pointer to identify the new entry.

* * * * *